United States Patent
Hobo et al.

(10) Patent No.: US 12,404,631 B2
(45) Date of Patent: Sep. 2, 2025

(54) INK-JET TREATMENT LIQUID, INK-JET TEXTILE PRINTING APPARATUS, AND INK-JET TEXTILE PRINTING METHOD

(71) Applicant: KYOCERA CORPORATION, Kyoto (JP)

(72) Inventors: Jumpei Hobo, Yamatokoriyama (JP); Jun Hioki, Muko (JP); Hiroko Sugimoto, Muko (JP); Go Toriyama, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/704,930

(22) PCT Filed: Apr. 21, 2023

(86) PCT No.: PCT/JP2023/015859
§ 371 (c)(1),
(2) Date: Apr. 26, 2024

(87) PCT Pub. No.: WO2023/210517
PCT Pub. Date: Nov. 2, 2023

(65) Prior Publication Data
US 2024/0328081 A1    Oct. 3, 2024

(30) Foreign Application Priority Data
Apr. 26, 2022    (JP) .................. 2022-072063

(51) Int. Cl.
*D06P 5/08* (2006.01)
*B41J 3/407* (2006.01)
*D06P 1/52* (2006.01)
*D06P 5/30* (2006.01)

(52) U.S. Cl.
CPC ............... *D06P 5/08* (2013.01); *B41J 3/4078* (2013.01); *D06P 1/5292* (2013.01); *D06P 5/30* (2013.01)

(58) Field of Classification Search
CPC .. D06P 5/08; D06P 5/30; D06P 1/5292; B41J 3/4078
See application file for complete search history.

(56) References Cited

FOREIGN PATENT DOCUMENTS

| | | | |
|---|---|---|---|
| EP | 1416020 A1 * | 5/2004 | ............. C09D 11/30 |
| JP | 2000169705 A | 6/2000 | |
| JP | 2001226616 A | 8/2001 | |
| JP | 2002188055 * | 7/2002 | |
| JP | 2004-346462 A | 12/2004 | |
| JP | 2016016556 A | 2/2016 | |
| JP | 2017533112 A | 11/2017 | |
| JP | 2021-102337 A | 7/2021 | |
| JP | 2021102337 * | 7/2021 | |
| WO | 2021182338 A1 | 9/2021 | |

* cited by examiner

*Primary Examiner* — Amina S Khan
(74) *Attorney, Agent, or Firm* — HAUPTMAN HAM, LLP

(57) ABSTRACT

An aspect of the present disclosure relates to an ink-jet treatment liquid containing: emulsified particles containing silicone oil; a surfactant; and an aqueous medium, wherein a content of the silicone oil is equal to or greater than 5 mass % and equal to or less than 15 mass % with respect to the entire treatment liquid, and the surfactant contains: a first surfactant containing an alkyl group having from 12 to 14 carbon atoms; and a second surfactant containing an alkyl group having from 16 to 18 carbon atoms.

8 Claims, 1 Drawing Sheet

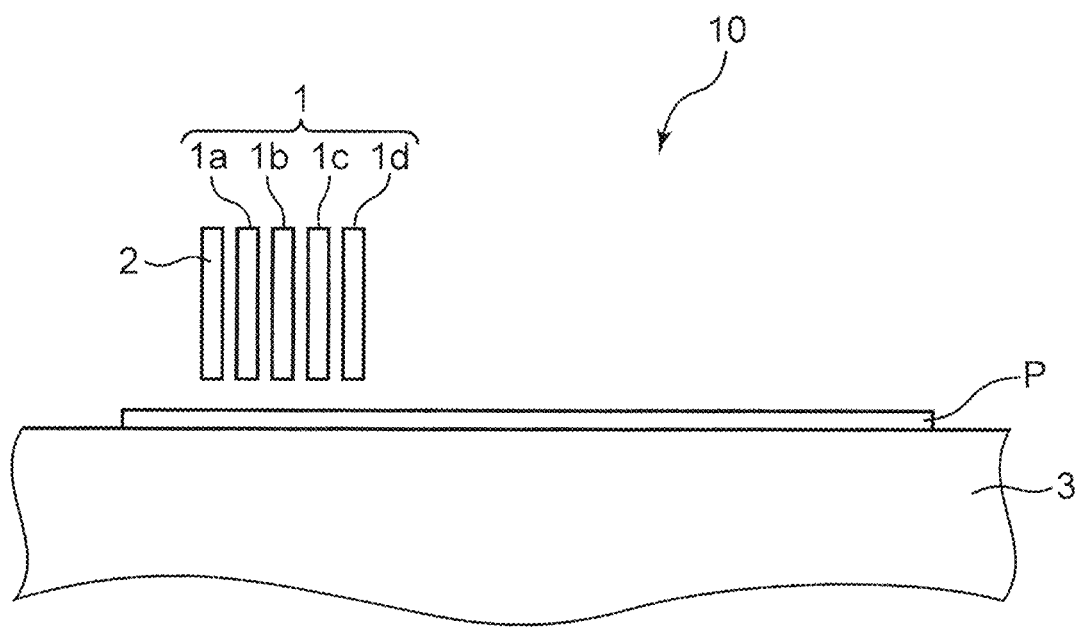

INK-JET TREATMENT LIQUID, INK-JET TEXTILE PRINTING APPARATUS, AND INK-JET TEXTILE PRINTING METHOD

RELATED APPLICATIONS

The present application is a National Phase of International Application Number PCT/JP2023/015859 filed Apr. 21, 2023, which claims the benefit of priority from Japanese Patent Application No. 2022-072063, filed on Apr. 26, 2022.

TECHNICAL FIELD

The present disclosure relates to an ink-jet treatment liquid. The present disclosure further relates to an ink-jet textile printing apparatus and an ink-jet textile printing method, each using the ink-jet treatment liquid.

BACKGROUND OF INVENTION

In an ink-jet recording system, it is known that a treatment liquid is applied after application of an ink in order to suppress deformation of a recording medium and/or to improve image fixability.

For example, Patent Document 1 discloses that feathering, bleeding, and paper deformation can be suppressed by using a treatment liquid containing a surfactant. This document also reports that a treatment liquid containing two types of surfactants is particularly preferably used.

It has been reported so far that ink drying properties, optical density, feathering, and image fixability can be simultaneously achieved by blending a surfactant in an ink-jet recording liquid (Patent Document 2).

CITATION LIST

Patent Literature

Patent Document 1: JP 2016-16556 A
Patent Document 2: JP 2001-226616 A

SUMMARY

An ink-jet treatment liquid according to an aspect of the present disclosure contains: emulsified particles containing silicone oil; a surfactant; and an aqueous medium, wherein a content of the silicone oil is equal to or greater than 5 mass % and equal to or less than 15 mass % with respect to the entire treatment liquid, and the surfactant contains: a first surfactant containing an alkyl group having from 12 to 14 carbon atoms; and a second surfactant containing an alkyl group having from 16 to 18 carbon atoms.

BRIEF DESCRIPTION OF THE DRAWINGS

FIG. 1 is a schematic view illustrating an embodiment of an ink-jet textile printing apparatus using an ink-jet treatment liquid of the present embodiment.

DESCRIPTION OF EMBODIMENTS

The treatment liquid described in Patent Document 1 contains a surfactant, but is intended for image quality and suppression of paper deformation, and no consideration has been given to its storage stability. The invention described in Patent Document 2 relates not to a treatment liquid but to an ink-jet recording liquid itself, and, further, this document does not describe improving the storage stability of the ink-jet recording liquid.

On the other hand, in a textile printing technique using an ink-jet, a post-treatment liquid containing silicone oil may be used in order to ensure fastness to rubbing of a printed textile. Studies conducted by the present inventors have revealed that, in the post-treatment liquid containing silicone oil to be ejected by the ink-jet, it is necessary to control a particle diameter of the silicone oil in order to ensure ejection stability. It has also been found that the particle diameter can be adjusted by adding a surfactant to the post-treatment liquid.

However, it has been found that long-term storage of a post-treatment liquid containing silicone oil and a surfactant results in separation of the surfactant from a surface of the silicone oil, which may make it difficult to maintain a desired particle diameter. If the particle diameter of the silicone oil cannot be maintained in an appropriate range, the ejection stability is difficult to ensure.

Each of the techniques described in Patent Documents 1 and 2 relates mainly to an ink-jet image forming method for performing printing on a paper medium such as plain paper or a low liquid-absorbing recording medium such as a film sheet, is intended to form a favorable image with suppressed bleeding and the like, and is less assumed to be used in textile printing on cloth or the like. However, ink-jet recording for use in textile printing requires properties specific to textile printing such as fastness properties to rubbing, in addition to image quality and the like.

Hereinafter, embodiments of the present disclosure will be specifically described; however, the present disclosure is not limited to these embodiments. In the present specification, a measured value of a volume median diameter ($D_{50}$) is a median diameter as measured using a laser diffraction/scattering grain size distribution measuring apparatus ("LA-950" available from HORIBA, Ltd), unless otherwise stated. Hereinafter, the volume median diameter is sometimes referred to as "$D_{50}$". "Main component" of a material refers to a component contained in the material in the largest amount on a mass basis, unless otherwise stated. "Specific gravity" refers to specific gravity at 25° C., unless otherwise stated. Acryl and methacryl may be collectively referred to as "(meth)acryl". For each component described in the present specification, one type may be used alone, or two or more types may be used in combination.

Ink-Jet Treatment Liquid

An ink-jet treatment liquid according to an embodiment of the present disclosure (hereinafter sometimes simply referred to as "treatment liquid") is an ink-jet treatment liquid containing: emulsified particles containing silicone oil; a surfactant; and an aqueous medium, wherein the content of the silicone oil is equal to or greater than 5 mass % and equal to or less than 15 mass % with respect to the entire treatment liquid, and the surfactant contains: a first surfactant containing an alkyl group having from 12 to 14 carbon atoms; and a second surfactant containing an alkyl group having from 16 to 18 carbon atoms.

With the above configuration, the treatment liquid of the present embodiment is stably ejected from an ink-jet head member and has excellent storage stability. That is, the present disclosure can provide an ink-jet treatment liquid that can be stably ejected from an ink-jet head member and has excellent storage stability. The ink-jet treatment liquid of the present disclosure, when used in textile printing, provides an advantage in that the ink-jet treatment liquid is also excellent in terms of fastness properties to rubbing.

The treatment liquid of the present embodiment is suitably used in, for example, an ink-jet textile printing apparatus and an ink-jet textile printing method which will be described later. The treatment liquid of the present embodiment is a treatment liquid for post-treatment. That is, after formation of an image in an image formation region of an object to be textile-printed with ink, the image formation region is post-treated with the treatment liquid of the present embodiment.

The treatment liquid of the present embodiment, when used for textile printing, provides an advantage that the fastness properties to rubbing can be improved in addition to the advantages described above.

Hereinafter, a configuration of the ink-jet treatment liquid according to the present embodiment will be described. The treatment liquid according to the present embodiment contains emulsified particles containing silicone oil, a surfactant, and an aqueous medium. That is, the treatment liquid of the present embodiment is an emulsion in which emulsified particles are dispersed in an aqueous medium, and more specifically, is an oil-in-water (O/W) emulsion.

Emulsified Particles

The emulsified particles contained in the treatment liquid contain silicone oil. The silicone oil contained in the emulsified particles is not particularly limited, but preferably contains at least a non-modified silicone oil. A printed textile superior in fastness properties to rubbing, particularly fastness property to wet rubbing when used for textile printing can be produced by blending the non-modified silicone oil.

Specific examples of the non-modified silicone oil include dimethylpolysiloxane, methylphenyl silicone oil, and methyl hydrogen silicone oil. Among them, dimethylpolysiloxane or the like is preferably used.

The silicone oil may be a silicone oil other than the non-modified silicone oil, or may contain both the non-modified silicone oil and any other silicone oil. In this case, one emulsified particle may contain both the non-modified silicone oil and the other silicone oil. Alternatively, in a treatment liquid containing two or more types of emulsified particles, for example, first emulsified particles may contain the non-modified silicone oil, and second emulsified particles may contain the other silicone oil. Examples of the other silicone oil include ionic group-containing silicone oils.

In a case in which the treatment liquid of the present embodiment is used for textile printing, a viscosity of the silicone oil is preferably equal to or greater than 500 mm$^2$/s (that is, mm$^2$/s). It is considered that silicone oil having a viscosity of equal to or greater than 500 mm$^2$/s is less likely to be detached from a printed textile by virtue of rubbing, and it is thus considered that a printed textile superior in fastness to dry rubbing and fastness to wet rubbing can be produced. As described above, the treatment liquid according to the present embodiment has excellent ejectability from a treatment head of the ink-jet textile printing apparatus. When the treatment liquid is ejected from the treatment head, the amount of treatment liquid to be used is reduced as compared with the case where the printed textile is immersed in the treatment liquid. Therefore, even when silicone oil having a high viscosity of equal to or greater than 500 mm$^2$/s is used in the treatment liquid, stiffness is less likely to be caused in the object to be textile-printed, which further suppresses a decrease in tactile sensation of the printed textile.

An upper limit of the viscosity of the silicone oil is not particularly limited. The viscosity of the silicone oil is, for example, preferably equal to or less than 100000 mm$^2$/s, and preferably equal to or less than 6000 mm$^2$/s. For example, the viscosity of the silicone oil may be within a range between two values selected from the group consisting of 500 mm$^2$/s, 700 mm$^2$/s, 900 mm$^2$/s, 1000 mm$^2$/s, 1100 mm$^2$/s, 1200 mm$^2$/s, 1500 mm$^2$/s, 1700 mm$^2$/s, 1800 mm$^2$/s, 2000 mm$^2$/s, 3000 mm$^2$/s, 5700 mm$^2$/s, and 6000 mm$^2$/s.

In the present embodiment, the viscosity of the silicone oil refers to a kinematic viscosity at 25° C. When the emulsified particles contain two or more types of silicone oils (for example, an ionic group-containing silicone oil and any other silicone oil), the viscosity of the silicone oil refers to a viscosity of a mixture of the two or more types of silicone oils.

The viscosity of the silicone oil is a value as measured in accordance with a method described in JIS (Japanese Industrial Standards) Z8803: 2011 (Methods for viscosity measurement of liquid). Specifically, for example, the silicone oil is extracted from the treatment liquid with toluene, washed, and dried to separate the silicone oil from the treatment liquid, and the viscosity of the silicone oil can be measured.

The content of the silicone oil in the treatment liquid of the present embodiment is equal to or greater than 5 mass % and equal to or less than 15 mass %. The content ratio of the silicone oil falling within the above range can further stabilize the ejectability of the treatment liquid, and can improve the fastness properties to rubbing when the treatment liquid is used for textile printing. The content ratio of the silicone oil in the treatment liquid is preferably equal to or greater than 7 mass %. The content ratio of the silicone oil in the treatment liquid is preferably equal to or less than 13 mass %.

In the present embodiment, the content ratio of the silicone oil in the treatment liquid refers to a percentage of a mass of the silicone oil with respect to a total mass of the treatment liquid. When the emulsified particles contain two or more types of silicone oils (for example, a non-modified silicone oil and any other silicone oil), the content ratio of the silicone oil refers to the percentage of the total mass of the two or more types of silicone oils with respect to the mass of the treatment liquid.

The emulsified particles may further contain a component other than the silicone oil. However, from the viewpoint of producing a printed textile having excellent fastness to rubbing, the emulsified particles preferably contain only silicone oil.

The average particle diameter of the emulsified particles (dispersed particle diameter in an aqueous medium) is preferably equal to or greater than 100 nm and equal to or less than 250 nm. The average particle diameter of the emulsified particles falling in the above range provides an advantage that the treatment liquid of the present embodiment is superior in ejectability from a treatment head of an ink-jet apparatus. The fastness properties to rubbing when the treatment liquid is used for textile printing can be more reliably obtained. The average particle diameter of the emulsified particles is in a range of more preferably equal to or greater than 120 nm and equal to or less than 220 nm, and even more preferably equal to or greater than 150 nm and equal to or less than 200 nm. Alternatively, the average particle diameter of the emulsified particles may be, for example, within a range between two values selected from the group consisting of 100 nm, 120 nm, 135 nm, 150 nm, 155 nm, 160 nm, 180 nm, 200 nm, 210 nm, 220 nm, and 250 nm.

In the present embodiment, the average particle diameter refers to a harmonic average particle diameter (also referred to as cumulant average particle diameter) based on a scattered light intensity as calculated based on a cumulant method. That is, the average particle diameter of the emulsified particles is a value measured in accordance with a method described in ISO 13321:1996 (Particle size analysis-Photon correlation spectroscopy).

In the present embodiment, when the ink-jet treatment liquid is stored at 60° C. for 30 days, an average particle diameter X of the emulsified particles in the treatment liquid before storage and an average particle diameter Y of the emulsified particles in the treatment liquid after storage preferably satisfy the following formula:

$$1.0 \leq Y/X \leq 1.05.$$

It is considered that, when the average particle diameter X and the average particle diameter Y satisfy the above formula, the average particle diameter of the emulsified particles does not significantly change even when the treatment liquid is stored for a long period of time, and thus that a treatment liquid having excellent storage stability can be more reliably obtained.

Further, the formula is more preferably $1.0 \leq Y/X \leq 1.03$.

In the present specification, the "treatment liquid before storage" is preferably a treatment liquid immediately after production, but may be a treatment liquid after storage for a predetermined period of time after production as long as it has not been stored in a particularly severe environment.

Surfactant

The treatment liquid of the present embodiment contains, as a surfactant, a first surfactant containing an alkyl group having from 12 to 14 carbon atoms and a second surfactant containing an alkyl group having from 16 to 18 carbon atoms. Due to such a surfactant contained in the treatment liquid, the treatment liquid can secure ejection stability. This is because the treatment liquid contains two types of surfactants each having carbon atoms in the above range, thereby helping prevent the above-described emulsified particles dispersed in the treatment liquid from being fused with each other and prevent the emulsified particles from becoming larger than necessary. That is, when the treatment liquid of the present embodiment contains the surfactant, the size (average particle diameter) of the emulsified particles dispersed in the treatment liquid can be maintained in an appropriate range.

When the treatment liquid contains not two types of surfactants as described above, but only one thereof, the surfactant is separated from the surface of the silicone oil forming the emulsified particles, and thus the average particle diameter of the emulsified particles cannot be maintained.

When the number of carbon atoms of the alkyl group contained in the first surfactant is equal to or less than 11, the surfactant is likely to be released from the silicone oil in a relatively high temperature range (around 60° C.). Thus, it is necessary to increase the amount of the first surfactant in order to ensure dispersion stability in the temperature range. However, since thixotropy is exhibited upon increase in amount of the first surfactant, the number of carbon atoms of the alkyl group contained in the first surfactant is set to be from 12 to 14. In a preferred embodiment, the number of carbon atoms of the alkyl group contained in the first surfactant is 12 and/or 14.

On the other hand, when the number of carbon atoms of the alkyl group contained in the second surfactant is equal to or greater than 19, the amount of the second surfactant not adhering to (not taken into) the silicone oil increases. As a result, the viscosity of the treatment liquid becomes too high or thixotropy is exhibited. Therefore, the number of carbon atoms of the alkyl group contained in the second surfactant is from 16 to 18. In a preferred embodiment, the number of carbon atoms of the alkyl group contained in the second surfactant is 16 and/or 18.

The first surfactant is not particularly limited as long as it is a surfactant containing an alkyl group having from 12 to 14 carbon atoms. Preferably, a polyoxyethylene alkyl ether can be used. More specific examples of usable polyoxyethylene alkyl ether include polyoxyethylene lauryl ether (C12), polyoxyethylene tridecyl ether (C13), and polyoxyethylene myristyl ether (C14). Further, the first surfactant may contain two or more compounds containing alkyl groups different in terms of the number of carbon atoms.

The second surfactant is not particularly limited as long as it is a surfactant containing an alkyl group having from 16 to 18 carbon atoms. Preferably, a polyoxyethylene alkyl ether can be used. More specific examples of usable polyoxyethylene alkyl ether include polyoxyethylene cetyl ether (C16) and polyoxyethylene stearyl ether (C18). Further, the second surfactant may contain two or more compounds containing alkyl groups different in terms of the number of carbon atoms.

A surfactant other than those described above may be added to the treatment liquid of the present embodiment as long as the effects of the present disclosure are not impaired.

In the treatment liquid of the present embodiment, the content of the second surfactant is preferably lower than the content of the first surfactant. Accordingly, it is considered that a treatment liquid having superior ejectability and storage stability can be obtained. Further, it is considered that a printed textile superior in fastness properties to rubbing, particularly fastness property to wet rubbing when used for textile printing can be obtained.

Further, the content of the first surfactant and the content of the second surfactant preferably satisfy the following equation:

Content of second surfactant/(content of first surfactant+content of second surfactant)=from 0.15 to 0.25 (mass %).

It is considered that, when the content of the second surfactant is within the above range with respect to the total content of the first surfactant and the second surfactant, the ejectability and the storage stability can be more reliably obtained. This is because too high a content of the second surfactant may exhibit thixotropy, which may lead to deterioration in ejectability and storage stability.

The total content of the first surfactant and the second surfactant in the treatment liquid of the present embodiment is preferably equal to or greater than 0.5 mass % and equal to or less than 4.0 mass % with respect to the entire treatment liquid. In particular, in order to obtain superior storage stability and ejectability, a lower limit value of the total content with respect to the entire treatment liquid is preferably equal to or greater than 1.0 mass %, and, further, more preferably equal to or greater than 1.5 mass %. An upper limit value of the total content is preferably equal to or less than 2.5 mass %, and, further, more preferably equal to or less than 2.0 mass %.

The total content of the first surfactant and the second surfactant in the treatment liquid of the present embodiment is preferably equal to or greater than 9.0 mass % and equal to or less than 40.0 mass % with respect to the content of the silicone oil. In particular, a lower limit value of the total content of the surfactants with respect to the content of the silicone oil is preferably equal to or greater than 10.0 mass %, and more preferably equal to or greater than 15 mass %, from the viewpoint of obtaining superior ejectability, and fastness properties to rubbing when the treatment liquid is used for textile printing. An upper limit value of the total content is preferably equal to or less than 35.0 mass %.

Aqueous Medium

The aqueous medium contained in the treatment liquid of the present embodiment is a medium containing water as a main component. The aqueous medium may function as a solvent or a dispersion medium. Specific examples of the aqueous medium include water and a mixed liquid of water and a polar solvent. Examples of the polar solvent contained in the aqueous medium include methanol, ethanol, isopropyl alcohol, butanol, and methyl ethyl ketone. A content ratio of the water in the aqueous medium is preferably equal to or greater than 90 mass %, and particularly preferably 100 mass %. The content ratio of the aqueous medium is preferably equal to or greater than 50 mass % and equal to or less than 90 mass % and more preferably equal to or greater than 55 mass % and equal to or less than 70 mass % with respect to the mass of the treatment liquid.

Other Components

The treatment liquid of the present embodiment may further contain a polyol according to need. When the treatment liquid contains a polyol, the viscosity of the treatment liquid is suitably adjusted. The polyol is preferably a diol or a triol. Examples of the diol include glycol compounds, and more specific examples thereof include ethylene glycol, propylene glycol, diethylene glycol, triethylene glycol, and tetraethylene glycol. Examples of the triol include glycerin. When the treatment liquid contains a polyol, the content ratio of the polyol is preferably equal to or greater than 10 mass % and equal to or less than 40 mass % and more preferably equal to or greater than 15 mass % and equal to or less than 35 mass % with respect to the mass of the treatment liquid.

The treatment liquid may contain other additives as long as the effects of the present disclosure are not impaired. Examples of the additives include a dispersant, a dissolution stabilizer, a drying inhibitor, an antioxidant, a viscosity modifier, a pH modifier, and an antifungal agent.

Method of Producing Treatment Liquid

A method of producing the treatment liquid of the present embodiment is not particularly limited, and an example thereof will be described. For example, a homogenizer is used to mix and emulsify the silicone oil, the surfactant, the aqueous medium, and a component to be added according to need (for example, a polyol). Thus, the treatment liquid can be obtained by dispersing the emulsified particles containing the silicone oil in the aqueous medium.

Intended Use

The treatment liquid of the present embodiment can be suitably used particularly for ink-jet textile printing. When a pigment ink capable of printing on many types of fabrics is used, the pigment must be fixed onto a surface of a fabric. If it cannot be fixed onto the surface of the fabric, poor fastness properties to rubbing are disadvantageously caused.

The use of the treatment liquid of the present embodiment can solve the problem. That is, the treatment liquid of the present embodiment is very useful from the viewpoint of industrial applicability, since it can improve the fastnesses to wet rubbing and dry rubbing in the production of a printed textile.

Ink-Jet Textile Printing Apparatus

An ink-jet textile printing apparatus according to the present embodiment will be described.

An ink-jet textile printing apparatus 10 according to the present embodiment includes at least a recording head 1 that ejects an ink to an image formation region of an object to be textile-printed, a treatment head 2 that ejects a treatment liquid to at least the image formation region of the object to be textile-printed, and a placement table 3 for transporting the object to be textile-printed, and the treatment liquid to be ejected from the treatment head is the above-described ink-jet treatment liquid. Note that, for easy understanding, FIG. 1 schematically illustrates each constituent element mainly, and the size, number, and the like of each illustrated constituent element may be appropriately changed. FIG. 1 is a side view illustrating a main part of the ink-jet textile printing apparatus 10 as an example of the ink-jet textile printing apparatus according to the present embodiment. The ink-jet textile printing apparatus 10 illustrated in FIG. 1 is a flat bed type ink-jet textile printing apparatus.

The ink-jet textile printing apparatus 10 according to the present embodiment treats an object P to be textile-printed using the treatment liquid of the present embodiment described above. Since the treatment liquid according to the present embodiment is used, the ink-jet textile printing apparatus 10 can provide a printed textile having excellent fastness property to wet rubbing, fastness property to dry rubbing, and the like.

The ink-jet textile printing apparatus 10 illustrated in FIG. 1 includes the recording head 1, the treatment head 2, and the placement table 3. The recording head 1 includes a first recording head 1a, a second recording head 1b, a third recording head 1c, and a fourth recording head 1d.

The recording head 1 ejects an ink to an image formation region of the object P to be textile-printed. The first recording head 1a, the second recording head 1b, the third recording head 1c, and the fourth recording head 1d included in the recording head 1 respectively eject inks of different colors (for example, yellow ink, magenta ink, cyan ink, and black ink). The recording head 1 is not particularly limited, and examples thereof include a piezoelectric head and a thermal ink-jet head.

The treatment head 2 ejects a treatment liquid for post-treatment to at least an image formation region of the object P to be textile-printed. The treatment liquid is the treatment liquid according to a first embodiment. The treatment head 2 is not particularly limited, and examples thereof include a piezoelectric head and a thermal ink-jet head. The ink-jet textile printing apparatus 10 of the present embodiment may further include one or more treatment liquid tanks (not illustrated) that store the treatment liquid. In this case, the treatment liquid is supplied from the one or more treatment liquid tanks to the treatment head 2.

The object P to be textile-printed is placed on the placement table 3. The recording head 1 and the treatment head 2 are disposed above the placement table 3 so that the ink and the treatment liquid can be ejected to the object P to be textile-printed. Upon driving of a motor (not illustrated), the placement table 3 moves horizontally in a direction from the recording head 1 toward the treatment head 2 (for example, leftward in FIG. 1). When the placement table 3 moves horizontally, the object P to be textile-printed on the placement table 3 is transported.

The object P to be textile-printed may be a woven fabric or a knitted fabric. Examples of the object P to be textile-printed include cotton fabric, silk fabric, hemp fabric, acetate fabric, rayon fabric, nylon fabric, polyurethane fabric, and polyester fabric.

In the production of the printed textile, first, the placement table 3 on which the object P to be textile-printed is placed moves horizontally, and the object P to be textile-printed is transported to a position facing the recording head 1. An ink is ejected from the recording head 1 to an image formation region of the object P to be textile-printed. In this way, an image is formed with the ink in the image formation region of the object P to be textile-printed. After the ink is ejected, the placement table 3 on which the object P to be textile-printed is placed further moves horizontally, and the object P to be textile-printed is transported to a position facing the treatment head 2. The treatment liquid is ejected from the treatment head 2 to at least the image formation region of the object P to be textile-printed. In this way, a treatment film is formed by the treatment liquid on the image formed in the image formation region of the object P to be textile-printed.

The treatment head 2 may eject the treatment liquid only to the image formation region of the object P to be textile-printed, may eject the treatment liquid to a region wider than the image formation region of the object P to be textile-printed, or may eject the treatment liquid to the entire surface of the object P to be textile-printed. In order to reduce the amount of the treatment liquid to be used and suppress a decrease in the tactile sensation of the printed textile, the treatment head 2 preferably ejects the treatment liquid only to the image formation region of the object P to be textile-printed, and more preferably ejects the treatment liquid only to the region to which the ink has been ejected by the recording head 1 in the image formation region. Since the treatment head 2 can accurately control the position where the treatment liquid is ejected, the treatment liquid can be ejected only to the region where the ink has been ejected. In order to accurately control the position where the treatment liquid is ejected, the distance between the treatment head 2 and the object P to be textile-printed is preferably equal to or greater than 1 mm and equal to or less than 5 mm. In addition, in order to efficiently perform the post-treatment with the treatment liquid, only the treatment liquid is preferably ejected from the treatment head 2.

After the treatment liquid is ejected from the treatment head 2 to the object P to be textile-printed, the placement table 3 on which the object P to be textile-printed is placed further moves horizontally, and the object P to be textile-printed is transported to a position facing a heating unit (not illustrated). The ink and the treatment liquid are dried by the heating unit heating the object P to be textile-printed. The heating temperature is, for example, equal to or higher than 120° C. and equal to or lower than 180° C. The heating time is, for example, equal to or greater than 1 minute and equal to or less than 10 minutes. The heating evaporates volatile components contained in the ink and the treatment liquid, and promotes fixation of the ink and the treatment liquid onto the object P to be textile-printed. As a result, a printed textile, which is the object P to be textile-printed on which an image is formed with the ink and which is treated with the treatment liquid, is produced.

The ink-jet textile printing apparatus 10 according to a second embodiment has been described above. However, the ink-jet textile printing apparatus of the present disclosure is not limited to the ink-jet textile printing apparatus 10 described above, and can be changed as indicated in the following variations, for example.

Regarding a first variation, the ink-jet textile printing apparatus 10 may include a spray that sprays the treatment liquid instead of the treatment head 2 that ejects the treatment liquid.

Regarding a second variation, the treatment with the treatment liquid may be performed by immersing the object P to be textile-printed in a tank in which the treatment liquid is collected. In the case of immersion, the amount of the treatment liquid to be ejected, as will be described later in a third embodiment, corresponds to the amount of the treatment liquid to be applied.

Regarding a third variation, the recording head 1 and the treatment head 2 may move horizontally while the placement table 3 is fixed, although the placement table 3 moves horizontally in the ink-jet textile printing apparatus 10.

Regarding a fourth variation, in the transport direction of the object P to be textile-printed, the placement table 3 may move horizontally, or the recording head 1 and the treatment head 2 may move horizontally, and the recording head 1 and the treatment head 2 may move horizontally in a direction orthogonal to the transport direction of the object P to be textile-printed.

Regarding a fifth variation, the number of recording heads 1 may be from one to three or five or more.

Regarding a sixth variation, the ink-jet textile printing apparatus may be an ink-jet textile printing apparatus which is not of a flat bed type. As long as the recording head 1 and the treatment head 2 are provided, the effects obtained by using the treatment liquid according to the first embodiment can be obtained regardless of the mode of the ink-jet textile printing apparatus.

Ink-Jet Textile Printing Method

An ink-jet textile printing method according to the present embodiment will be described with reference to FIG. 1. The ink-jet textile printing method of the present embodiment is a method of forming an image in an image formation region of an object P to be textile-printed using the treatment liquid described above. Alternatively, the ink-jet textile printing method of the present embodiment is also a method of forming an image in the image formation region of the object P to be textile-printed using the ink-jet textile printing apparatus 10 described above. The ink-jet textile printing method of the present embodiment uses the above-described treatment liquid, and thus can produce a printed textile having excellent fastness to rubbing. Furthermore, the treatment liquid of the present embodiment has excellent ejectability from the treatment head, and thus can reliably provide these effects in the ink-jet textile printing method.

The ink-jet textile printing method of the present embodiment includes ink ejection and treatment. The ink ejection involves ejecting an ink from the recording head 1 to the image formation region of the object P to be textile-printed. In the treatment, the treatment liquid is ejected from the treatment head 2 to at least the image formation region of the object P to be textile-printed. The treatment liquid is the treatment liquid according to the first embodiment. The treatment is preferably post-treatment performed after the ink ejection. The ink-jet textile printing method may further include heating if necessary.

In the ink ejection, the amount of the ink to be ejected with respect to the object P to be textile-printed is, for example, equal to or greater than 5 $g/m^2$ and equal to or less than 40 $g/m^2$.

In the treatment, the amount of the treatment liquid to be ejected with respect to the object P to be textile-printed is, for example, equal to or greater than 10 $g/m^2$ and equal to or less than 120 $g/m^2$ (including a case where the treatment liquid is applied). In order to particularly improve the fastness to dry rubbing, the amount of the treatment liquid to be ejected is preferably equal to or greater than 15 $g/m^2$ and equal to or less than 30 $g/m^2$. In order to particularly improve the fastness to wet rubbing in addition to the fastness to dry rubbing, the amount of the treatment liquid to be ejected is more preferably equal to or greater than 17 g/m² and equal to or less than 25 g/m².

Ink

The ink used in ink-jet recording together with the treatment liquid of the present embodiment and the ink used in the textile printing apparatus or the textile printing method are not particularly limited, and, for example, can be an ink containing a pigment and an aqueous medium. The ink may further contain at least one type selected from the group consisting of a surfactant, a polyol, and binder resin particles, according to need.

As the pigment, for example, a dispersible pigment dispersed in the aqueous medium can be used. D50 of the pigment is preferably equal to or greater than 30 nm and equal to or less than 250 nm, and more preferably equal to or greater than 70 nm and equal to or less than 160 nm, from the viewpoint of obtaining an ink excellent in terms of image density, hue, and color stability.

Examples of the pigment include a yellow pigment, an orange pigment, a red pigment, a blue pigment, a purple pigment, and a black pigment. Examples of the yellow pigment include C. I. Pigment Yellow (74, 93, 95, 109, 110, 120, 128, 138, 139, 151, 154, 155, 173, 180, 185, and 193). Examples of the orange pigment include C. I. Pigment Orange (34, 36, 43, 61, 63, and 71). Examples of the red pigment include C. I. Pigment Red (122 and 202). Examples of the blue pigment include C. I. Pigment Blue (15, more specifically 15:3). Examples of the violet pigment include C. I. Pigment Violet (19, 23, and 33). Examples of the black pigment include C. I. Pigment Black (7).

The content ratio of the pigment is preferably equal to or greater than 1 wt % and equal to or less than 12 wt % and more preferably equal to or greater than 1 wt % and equal to or less than 7 wt % with respect to the total weight of the ink. When the content ratio of the pigment is equal to or greater than 1 wt %, the image density of a recorded matter to be formed can be improved. In addition, when the content ratio of the pigment is equal to or less than 12 wt %, an ink having high fluidity is obtained.

In particular, the ink of the present embodiment preferably contains an anionic pigment. Thus, the anionic pigment and a cationic polymer contained in the above-described treatment liquid electrically react and aggregate on a surface of an object to be recorded, thereby making it possible to suppress a binding resin (binder resin which will be described below) contained in the ink from penetrating into a recording medium. This is particularly important in a case in which the recording medium is a fabric as this helps prevent the binding resin from penetrating into gaps between respective fibers and from binding the fibers to each other. This can enhance the texture (skin touch and the like) of the object to be textile-printed.

Specifically, the anionic pigment is more preferably an anionic pigment containing an anionic group such as a carboxyl group, a sulfonic acid group, a phosphoric acid group, a phosphonic acid group, a phenylsulfonic acid group, or a phenylcarboxyl group.

The aqueous medium contained in the ink of the present embodiment is a medium containing water as a main component. The aqueous medium may function as a solvent or a dispersion medium. Specific examples of the aqueous medium include water and a mixed liquid of water and a polar solvent. Examples of the polar solvent contained in the aqueous medium include methanol, ethanol, isopropyl alcohol, butanol, and methyl ethyl ketone. The content ratio of the water in the aqueous medium is preferably equal to or greater than 90 wt %, and particularly preferably 100 wt %.

The content ratio of the aqueous medium is preferably equal to or greater than 5 wt % and equal to or less than 70 wt % and more preferably equal to or greater than 40 wt % and equal to or less than 60 wt % with respect to the total weight of the ink.

When the ink contains a surfactant, the wettability of the ink with respect to the object to be recorded is improved. Examples of the surfactant include anionic surfactants, cationic surfactants, nonionic surfactants, and amphoteric surfactants. The surfactant contained in the ink is preferably a nonionic surfactant. The nonionic surfactant is preferably a surfactant having an acetylene glycol structure, and more preferably an acetylene diol ethylene oxide adduct. An HLB value of the surfactant is preferably equal to or greater than 3 and equal to or less than 20, more preferably equal to or greater than 6 and equal to or less than 16, and even more preferably equal to or greater than 7 and equal to or less than 10. The HLB value of the surfactant is calculated by, for example, the Griffin method from the equation "HLB value=20×(sum of formula weights of hydrophilic portions)/molecular weight". In order to improve the image density while suppressing image offset, the content ratio of the surfactant is preferably equal to or greater than 0.1 wt % and equal to or less than 5.0 wt % and more preferably equal to or greater than 0.5 wt % and equal to or less than 2.0 wt % with respect to the total weight of the ink.

When the ink contains a polyol, the viscosity of the ink is suitably adjusted. The polyol contained in the ink is preferably a diol or a triol. Examples of the diol include glycol compounds, and more specific examples thereof include ethylene glycol, propylene glycol, diethylene glycol, triethylene glycol, and tetraethylene glycol. Examples of the triol include glycerin.

When the ink contains a polyol, the content ratio of the polyol is preferably equal to or greater than 5 wt % and equal to or less than 60 wt % and more preferably equal to or greater than 20 wt % and equal to or less than 50 wt % with respect to the total weight of the ink in order to suitably adjust the viscosity of the ink.

The binder resin particles contained in the ink of the present embodiment are dispersed in the aqueous medium. The binder resin particles function as a binder that binds the object to be textile-printed and the pigment. Therefore, when the ink contains the binder resin particles, a printed textile having excellent fixability of the pigment can be obtained.

Examples of the resin contained in the binder resin particles include a urethane resin, a (meth)acrylic resin, a styrene-(meth)acrylic resin, a styrene-maleic acid copolymer, a vinylnaphthalene-(meth)acrylic acid copolymer, and a vinylnaphthalene-maleic acid copolymer. The resin contained in the binder resin particles is preferably a urethane resin. The content ratio of the urethane resin in the binder resin particles is preferably equal to or greater than 80 wt %, and more preferably 100 wt %.

The content ratio of the binder resin is preferably equal to or greater than 1 wt % and equal to or less than 20 wt % and more preferably equal to or greater than 2 wt % and equal to or less than 10 wt % with respect to the total weight of the ink. When the content ratio of the binder resin particles is equal to or greater than 1 wt %, an object to be recorded having excellent fixability of the pigment can be obtained. On the other hand, when the content ratio of the binder resin particles is equal to or less than 20 wt %, the ink can be stably ejected onto the object to be recorded.

The ink of the present embodiment may further contain known additives (more specific examples thereof include a dissolution stabilizer, a drying inhibitor, an antioxidant, a viscosity modifier, a pH modifier, and an antifungal agent) according to need.

The ink used in the present embodiment is produced by mixing a pigment, an aqueous medium, and components to be added according to need (for example, a surfactant, a polyol, and binder resin particles) using a stirrer, for example. The mixing time is, for example, equal to or greater than 1 minute and equal to or less than 30 minutes.

EXAMPLE

Hereinafter, the present disclosure will be described more specifically with reference to examples, but the present disclosure is not limited by the examples.

In the examples which will be described below, the average particle diameter of each emulsified particle is a value as measured by a method which will be described below.

Method of Measuring Average Particle Diameter of Emulsified Particles

The average particle diameter of the emulsified particles was measured using a laser diffraction grain size distribution measuring apparatus ("Zetasizer Nano ZS" available from Malvern Instruments Ltd) in accordance with the method described in ISO 13321:1996 (Particle size analysis-Photon correlation spectroscopy). For the measurement of the average particle diameter of the emulsified particles, a measurement sample obtained by diluting the treatment liquid 1000 times with water was used.

First surfactants and second surfactants used in the present examples are as follows.

First Surfactant
   Surfactant 1 (polyoxyethylene lauryl ether, alkyl group: C12)
   Surfactant 2 (polyoxyethylene tridecyl ether, alkyl group: C13)
   Surfactant 3 (polyoxyethylene myristyl ether, alkyl group: C14) (Second Surfactant)
   Surfactant 4 (polyoxyethylene cetyl ether, alkyl group: C16)
   Surfactant 5 (polyoxyethylene stearyl ether, alkyl group: C18).

Example 1

Five (5) g of a non-modified silicone oil ("KF96-3000cs" available from Shin-Etsu Chemical Co., Ltd., dimethylpolysiloxane, viscosity: 3000 mm$^2$/s, specific weight: 0.97), 63.37 g of ion-exchange water, 30 g of propyleneglycol, 1.3 g of a first surfactant (surfactant 1: C=12) and 0.33 g of a second surfactant (surfactant 4: C=16) were placed in a beaker. Using a homogeniser ("ULTRA-TURRAX T25" available from IKA), the contents of the beaker were stirred for 15 minutes at a rotational speed of 10000 rpm and left to stand for 30 minutes. Next, the contents of the beaker were filtered through a 120 mesh stainless steel filter to obtain a treatment liquid 1. Emulsified particles containing the non-modified silicone oil were dispersed in the treatment liquid 1. The average particle diameter (X) of the emulsified particles was 115 nm.

Example 2

Ten (10) g of a non-modified silicone oil ("KF96-3000cs" available from Shin-Etsu Chemical Co., Ltd., dimethylpolysiloxane, viscosity: 3000 mm$^2$/s, specific weight: 0.97), 58.37 g of ion-exchange water, 30 g of propyleneglycol, 1.3 g of a first surfactant (surfactant 1: C=12) and 0.33 g of a second surfactant (surfactant 4: C=16) were placed in a beaker. Using a homogeniser ("ULTRA-TURRAX T25" available from IKA), the contents of the beaker were stirred for 15 minutes at a rotational speed of 10000 rpm and left to stand for 30 minutes. Next, the contents of the beaker were filtered through a 120 mesh stainless steel filter to obtain a treatment liquid 1. Emulsified particles containing the non-modified silicone oil were dispersed in the treatment liquid 2. The average particle diameter (X) of the emulsified particles was 138 nm.

Examples 3 to 14 and Comparative Examples 1 to 3

Treatment liquids of Examples 3 to 14 and Comparative Examples 1 to 3 (treatment liquids 3 to 17) were obtained in the same manner as in Example 1 except that the amounts (wt %) of the non-modified silicone oil, first surfactant, and second surfactant blended were changed to those shown in Table 1, and that the amount of the ion-exchanged water was adjusted so that the total amount of the above-described components, in combination with 30 g of propylene glycol (fixed), reached 100 g. Emulsified particles containing the non-modified silicone oil were dispersed in each of the obtained treatment liquids. The average particle diameter (X) of the emulsified particles in each of the treatment liquids is shown in Table 2 below.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Silicone oil |  | 5 | 10 | 15 | 10 | 10 | 5 | 15 | 10 | 10 |
| First surfactant | Surfactant 1 (C12) | 1.3 | 1.3 | 1.3 | — | — | 1.3 | 1.3 | 1.2 | 1 |
|  | Surfactant 2 (C13) | — | — | — | 1.3 | — | — | — | — | — |
|  | Surfactant 3 (C14) | — | — | — | — | 1.3 | — | — | — | — |
| Second surfactant | Surfactant 4 (C16) | 0.33 | 0.33 | 0.33 | 0.33 | 0.33 | — | — | — | — |
|  | Surfactant 5 (C18) | — | — | — | — | — | 0.33 | 0.33 | 0.3 | 0.33 |
| Total content of surfactants |  | 1.63 | 1.63 | 1.63 | 1.63 | 1.63 | 1.63 | 1.63 | 1.5 | 1.33 |

TABLE 1-continued

| | Example 1 | Example 2 | Example 3 | Example 4 | Example 5 | Example 6 | Example 7 | Example 8 | Example 9 |
|---|---|---|---|---|---|---|---|---|---|
| Second surfactant/(first surfactant + second surfactant) | 0.202 | 0.202 | 0.202 | 0.202 | 0.202 | 0.202 | 0.202 | 0.200 | 0.248 |
| Total content of surfactants/silicone oil content | 32.6 | 16.3 | 10.9 | 16.3 | 16.3 | 32.6 | 10.9 | 15.0 | 13.3 |

| | | Example 10 | Example 11 | Example 12 | Example 13 | Example 14 | Comparative Example 1 | Comparative Example 2 | Comparative Example 3 |
|---|---|---|---|---|---|---|---|---|---|
| Silicone oil | | 10 | 10 | 10 | 10 | 10 | 10 | 4 | 17 |
| First surfactant | Surfactant 1 (C12) | 1.7 | 1.8 | 1 | 0.72 | 0.8 | 1.3 | 1.3 | 1.3 |
| | Surfactant 2 (C13) | — | — | — | — | — | — | — | — |
| | Surfactant 3 (C14) | — | — | — | — | — | — | — | — |
| Second surfactant | Surfactant 4 (C16) | — | 0.3 | 0.35 | 0.18 | 0.8 | — | 0.33 | 0.33 |
| | Surfactant 5 (C18) | 0.3 | — | — | — | — | — | — | — |
| Total content of surfactants | | 2 | 2.1 | 1.35 | 0.9 | 4 | 1.3 | 1.63 | 1.63 |
| Second surfactant/(first surfactant + second surfactant) | | 0.150 | 0.143 | 0.259 | 0.200 | 0.200 | — | 0.202 | 0.202 |
| Total content of surfactants/silicone oil content | | 20.0 | 21.0 | 13.5 | 9.0 | 40.0 | 13.0 | 40.8 | 9.6 |

Evaluation Method

Storage Stability

Each of the treatment liquids 1 to 17 obtained in the Examples and the Comparative Examples was placed in an amount of 400 g in a 500 mL plastic container, and left to stand and stored in an oven at 60° C. for 30 days. After 30 days, the plastic container stored in the oven was taken out. After the treatment liquids were cooled to room temperature, the average particle diameter (Y) of the emulsified particles in each of the treatment liquids was measured, and an ejectability test which will be described below was performed.

Ejectability

The ejectability of the treatment liquid was evaluated using an ejection evaluation machine ("KJ4B" available from KYOCERA Corporation) capable of confirming ejection of the treatment liquid, drop by drop, from a nozzle based on a video image of a camera. The ejectability was evaluated for both the treatment liquid before storage (immediately after production of the treatment liquid) and the treatment liquid after storage for 30 days, as described for the storage stability above.

Conditions in the ejection evaluation machine were set as follows.

Ejection evaluation machine conditions:
Temperature: 32° C.
Amount of treatment liquid to be ejected from head: 10 g/m²
Drive frequency: 30 kHz A specific method for evaluating the ejectability is as follows. First, the ejection evaluation machine was used to adjust the camera position so that three nozzles could be seen in one field of view. Next, the ejection of the treatment liquid was started, and whether or not the treatment liquid was normally ejected was visually confirmed through the video image of the camera over 1 minute. After a lapse of 1 minute, the number of nozzles which normally ejected the treatment liquid was counted. Here, the nozzle that normally ejected the treatment liquid is a nozzle other than a nozzle that did not normally eject the treatment liquid (a nozzle that did not eject the treatment liquid straightly, a nozzle that did not eject the treatment liquid, a nozzle from which the treatment liquid overflowed, or the like). The camera position was moved, and the confirmation of the ejectability of the treatment liquid in 1 minute through the video image of the camera was similarly repeated for another nozzle. A total of 36 nozzles were confirmed at a total of 12 locations. Finally, the number of nozzles that normally ejected the treatment liquid was totaled, and the ejectability of the treatment liquid was evaluated according to the following determination criteria.

Determination Criteria
A: 36
B: from 34 to 35
C: Equal to or less than 33

Fastness Properties to Rubbing

The treatment liquids obtained in the Examples and the Comparative Examples were used to produce printed textiles, and the fastness properties to rubbing (fastness to wet rubbing and fastness to dry rubbing) of each printed textile was evaluated.

Preparation of Ink

First, an ink used in textile printing was prepared. A 1-L-volume three-necked flask equipped with a stirring blade was charged with 125 g of deionized water and 2 g of a nonionic surfactant ("Surfynol (registered trademark) 440" available from Nissin Chemical Industry Co., Ltd., content: acetylene glycol ethylene oxide adduct). While the contents of the flask were stirred, 165 g of propylene glycol, 100 g of a black pigment dispersion ("AE2078F" available from SANYO COLOR WORKS, Ltd., content: C. I. Pigment Black 7, solid content concentration: 20 mass %), and 108 g of a binder resin particle dispersion ("Superflex 470" available from DKS Co. Ltd., content: polyurethane dispersion, solid content concentration: 38 mass %) were sequentially added to the flask. The contents of the flask were stirred for 10 minutes to obtain an ink.

Production of Printed Textile for Evaluation

The ink and the treatment liquids 1 to 17 were used to produce printed textiles for evaluation.

As an object to be textile-printed, a cotton broadcloth (available from Shikisensha Co., Ltd., size: A4 size, cotton yarn count of warp and weft: 40/1, density of warp: 130 yarns/inch, density of weft: 75 yarns/inch, basis weight: 122 g/m$^2$) was used. An ink-jet printer ("Colorio (registered trademark) PX-045A" available from Seiko Epson Corporation) was used to produce the printed textiles for evaluation. The ink was filled in a first ink chamber of a first cartridge, and the treatment liquid was filled in a second ink chamber of a second cartridge. Next, the first cartridge and the second cartridge were mounted in the ink-jet printer. The ink filled in the first ink chamber is ejected from a recording head of the ink-jet printer, and the treatment liquid filled in the second ink chamber is ejected from a treatment head of the ink-jet printer.

The ink-jet printer was used to eject the ink from the recording head onto the object to be textile-printed so that the amount of the ink to be ejected was 20 g/m$^2$, thereby forming a solid image composed of the ink. Next, the ink-jet printer was used to eject the treatment liquid from the treatment head to the object to be textile-printed so that the amount of the treatment liquid to be ejected was 20 g/m$^2$ as described above. In this way, a treatment film having the same size as the size of the solid image was formed on the solid image composed of the ink by using the treatment liquid. Next, the object to be textile-printed was heated at 160° C. for 3 minutes to dry the ink and the treatment liquid, thereby obtaining a printed textile for evaluation.

Method of Evaluating Fastness to Rubbing

The solid image formed on the printed textile for evaluation was rubbed using a white cotton cloth for rubbing in accordance with a dry test and a wet test on a rubbing tester type II (Japan Society for the Promotion of Science type) method described in JIS L 0849:2013 (Test Methods for color fastness to rubbing). The degree of coloration of the white cotton cloth for rubbing after rubbing was evaluated in accordance with "Determination Criteria for Fading/Discoloration" described in Item 10 (Determination of color fastness) of JIS L 0801:2011 (General principles of testing methods for color fastness). The degree of coloration of the white cotton cloth for rubbing was determined on a scale of nine levels (grade 1, grade 1 to 2, grade 2, grade 2 to 3, grade 3, grade 3 to 4, grade 4, grade 4 to 5, and grade 5 in descending order of the degree of contamination). The fastness to rubbing becomes better as the degree of coloration of the white cotton cloth for rubbing decreases (closer to grade 5). From the degree of coloration of the white cotton cloth for rubbing after the rubbing test, the fastness to dry rubbing and the fastness to wet rubbing were evaluated according to the following criteria. Note that the determination result of the dry test was defined as the fastness to dry rubbing, and the determination result of the wet test was defined as the fastness to wet rubbing. A case in which the fastness to rubbing was evaluated as A or B was regarded as acceptable, and a case in which the fastness to rubbing was evaluated as C was regarded as unacceptable. The determined fastness to rubbing and the evaluation results are collectively shown in Table 2 below.

Evaluation Criteria for Fastness to Dry Rubbing
    Evaluation A: The fastness to dry rubbing is equal to or higher than grade 4.
    Evaluation B: The fastness to dry rubbing is grade 3 to 4.
    Evaluation C: The fastness to dry rubbing is equal to or lower than grade 3.

Evaluation Criteria for Fastness to Wet Rubbing
    Evaluation A: The fastness to wet rubbing is equal to or higher than grade 3.
    Evaluation B: The fastness to wet rubbing is grade 2 to 3.
    Evaluation C: The fastness to wet rubbing is equal to or lower than grade 2.

The results of the above evaluation tests are summarized in Table 2.

TABLE 2

| Endpoint | Example 1 | Example 2 | Example 3 | Example 4 | Example 5 | Example 6 | Example 7 | Example 8 | Example 9 |
|---|---|---|---|---|---|---|---|---|---|
| Average particle diameter X (nm) of emulsified particles | 115 | 138 | 170 | 139 | 138 | 115 | 175 | 140 | 147 |
| Average particle diameter Y (nm) of emulsified particles | 116 | 138 | 172 | 139 | 139 | 115 | 178 | 142 | 148 |
| Y/X | 1.009 | 1.000 | 1.012 | 1.000 | 1.007 | 1.000 | 1.017 | 1.014 | 1.007 |
| Ejectability (before storage) | A | A | A | A | A | A | A | A | A |
| Ejectability (after storage for 30 days) | A | A | A | A | A | A | A | A | A |
| Grade of fastness to dry rubbing | 4 | 4 | 4 | 4 | 4 | 4 | 4 | 4 | 4 |
| Evaluation of fastness to dry rubbing | A | A | A | A | A | A | A | A | A |
| Grade of fastness to wet rubbing | 3 | 3 | 3 | 3 | 3 | 3 | 3 | 3 | 3 |
| Evaluation of fastness to wet rubbing | A | A | A | A | A | A | A | A | A |

TABLE 2-continued

| Endpoint | Example 10 | Example 11 | Example 12 | Example 13 | Example 14 | Comparative Example 1 | Comparative Example 2 | Comparative Example 3 |
|---|---|---|---|---|---|---|---|---|
| Average particle diameter X (nm) of emulsified particles | 125 | 130 | 147 | 202 | 114 | 145 | 114 | 230 |
| Average particle diameter Y (nm) of emulsified particles | 126 | 135 | 148 | 220 | 116 | 305 | 115 | 260 |
| Y/X | 1.008 | 1.038 | 1.007 | 1.089 | 1.018 | 2.103 | 1.009 | 1.130 |
| Ejectability (before storage) | A | A | B | B | B | A | C | C |
| Ejectability (after storage for 30 days) | A | A | B | B | B | C | C | C |
| Grade of fastness to dry rubbing | 4 | 4 | 4 | 4 | 4 | 4 | 3-5 | 3-5 |
| Evaluation of fastness to dry rubbing | A | A | A | A | A | A | B | B |
| Grade of fastness to wet rubbing | 3 | 3 | 3 | 3 | 2-5 | 3 | 2 | 2 |
| Evaluation of fastness to wet rubbing | A | A | A | A | B | A | C | C |

Discussion

From the results shown in Table 2, it could be confirmed that the treatment liquid of the present disclosure is excellent in terms of ink-jet ejectability, and, when used for textile printing, is also excellent in terms of fastness properties to rubbing of the obtained printed textile. It was also confirmed that, even after storage at 60° C. for 30 days, the average particle diameter of the emulsified particles in the treatment liquid did not change much, and the ejectability was not deteriorated.

In consideration of the results of Examples 11 to 14, it was also found that, when the total content of the surfactants was in a more preferable range, a treatment liquid having superior storage stability and ejectability was obtained. That is, it was shown, from Examples 11 to 14 that, when the total content of the surfactants is small, the ejectability tends to be inferior, and that, when the total content of the surfactants is large, the fastness property to wet rubbing also tends to be slightly deteriorated in addition to the deterioration of the ejectability. From the results of Examples 11 and 12, it was found that, when the content of second surfactant/(content of first surfactant+content of second surfactant) is within a predetermined range, the storage stability and the ejectability are superior.

On the other hand, in Comparative Example 1 in which the treatment liquid containing only the first surfactant was used, the average particle diameter of the emulsified particles after storage for 30 days was large, and the ejectability after storage deteriorated. That is, Comparative Example 1 was inferior in terms of storage stability.

In the treatment liquid of Comparative Example 2 in which the content of the silicone oil was too low, the ejectability and the fastness properties to rubbing (particularly, the fastness property to wet rubbing) were poor. In the treatment liquid of Comparative Example 3 in which the content of the silicone oil was excessively high, all of the storage stability, the ejectability, and the fastness properties to rubbing (particularly, the fastness property to wet rubbing) were poor.

REFERENCE SIGNS

1: Recording head
1a: First recording head
1b: Second recording head
1c: Third recording head
1d: Fourth recording head
2: Treatment head
3: Placement table
10: Ink-jet textile printing apparatus
P: Object to be textile-printed

The invention claimed is:

1. An ink-jet treatment liquid comprising:
   emulsified particles containing silicone oil, a surfactant and an aqueous medium, wherein
   a content of the silicone oil is equal to or greater than 5 mass % and equal to or less than 15 mass % with respect to the entire of the treatment liquid,
   the surfactant comprises a first surfactant containing an alkyl group having from 12 to 14 carbon atoms and a second surfactant containing an alkyl group having from 16 to 18 carbon atoms, wherein the first and second surfactants are polyoxyethylene alkyl ethers, and
   a content of the first surfactant and a content of the second surfactant satisfy the following equation:
   content of second surfactant/(content of first surfactant+content of second surfactant)=from 0.15 to 0.25, and a total content of the first surfactant and the second surfactant is equal to or greater than 0.5 mass % and equal to or less than 2.5 mass % with respect to the entire treatment liquid.

2. The ink-jet treatment liquid according to claim 1, wherein
   the first surfactant comprises two or more compounds containing alkyl groups having different numbers of carbon atoms.

3. The ink-jet treatment liquid according to claim 1, wherein
   the second surfactant comprises two or more compounds containing alkyl groups having different numbers of carbon atoms.

4. The ink-jet treatment liquid according to claim 1, wherein
   a total content of the first surfactant and the second surfactant is equal to or greater than 9.0 mass % and equal to or less than 33.0 mass % with respect to a content of the silicone oil.

5. The ink-jet treatment liquid according to claim 1, wherein the emulsified particles have an average particle diameter of equal to or greater than 100 nm and equal to or less than 250 nm.

6. The ink-jet treatment liquid according to claim 5, wherein
when the ink-jet treatment liquid is stored at 60° C. for 30 days, an average particle diameter X of the emulsified particles in the treatment liquid before storage and an average particle diameter Y of the emulsified particles in the treatment liquid after storage satisfy the following formula:

$$1.0 \le Y/X \le 1.05.$$

7. The ink-jet treatment liquid according to claim 1, wherein the ink-jet treatment liquid is used for textile printing.

8. An ink-jet textile printing method comprising:
ejecting an ink from a recording head in an image formation region of an object to be textile-printed; and
ejecting a treatment liquid from a treatment head in at least the image formation region of the object to be textile-printed, wherein
the treatment liquid is the ink-jet treatment liquid according to claim 1.

* * * * *